United States Patent
Xiao et al.

(10) Patent No.: US 10,686,562 B2
(45) Date of Patent: Jun. 16, 2020

(54) METHOD AND APPARATUS FOR FEEDING BACK HYBRID AUTOMATIC REPEAT REQUEST OF DOWNLINK DATA

(71) Applicant: Huawei Technologies Co., Ltd., Shenzhen (CN)

(72) Inventors: Jiehua Xiao, Shanghai (CN); Yongxia Lyu, Ottawa (CA); Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/139,688

(22) Filed: Sep. 24, 2018

(65) Prior Publication Data

US 2019/0028242 A1   Jan. 24, 2019

Related U.S. Application Data

(63) Continuation of application No. PCT/CN2017/078094, filed on Mar. 24, 2017.

(30) Foreign Application Priority Data

Mar. 24, 2016   (WO) ................ PCT/CN2016/077255

(51) Int. Cl.
*H04L 1/18*   (2006.01)
*H04L 1/16*   (2006.01)
(Continued)

(52) U.S. Cl.
CPC .............. *H04L 1/1812* (2013.01); *H04L 1/16* (2013.01); *H04L 1/1607* (2013.01);
(Continued)

(58) Field of Classification Search
CPC ....... H04L 1/1812; H04L 1/16; H04L 1/1067; H04L 1/1854; H04W 72/042
See application file for complete search history.

(56) References Cited

U.S. PATENT DOCUMENTS

2013/0258914 A1   10/2013   Seo et al.
2014/0161060 A1    6/2014   Nam et al.
(Continued)

FOREIGN PATENT DOCUMENTS

CN   101789851 A   7/2010
CN   102075313 A   5/2011
(Continued)

OTHER PUBLICATIONS

3rd Generation Partnership Project; Technical Specification Group Radio Access Network; Evolved Universal Terrestrial Radio Access (E-UTRA); Physical channels and modulation (Release 13), 3GPP TS 36.211 V13.0.0 (Dec. 2015), 142 pages.
(Continued)

*Primary Examiner* — Ronald B Abelson
(74) *Attorney, Agent, or Firm* — Slater Matsil, LLP

(57) ABSTRACT

This application discloses a method for a hybrid automatic repeat request (HARQ) feedback of downlink data. A terminal receives downlink data of a physical downlink shared channel (PDSCH) and downlink data of a physical downlink control channel (PDCCH) or an enhanced physical downlink control channel (EPDCCH) from a base station. Then the terminal sends a hybrid automatic repeat request (HARQ) feedback codebook to the base station. A size of the HARQ feedback codebook is based on a state of a semi-persistent scheduling (SPS) PDSCH transmission and a total downlink assignment indicator in the downlink data of the PDCCH or the EPDCCH, and the HARQ feedback codebook comprises a HARQ bit for the SPS PDSCH transmission.

16 Claims, 7 Drawing Sheets

(51) Int. Cl.
*H04W 72/04* (2009.01)
*H04L 5/00* (2006.01)
(52) U.S. Cl.
CPC ......... *H04L 1/1854* (2013.01); *H04W 72/042* (2013.01); *H04L 5/001* (2013.01)

(56) References Cited

U.S. PATENT DOCUMENTS

2017/0048055 A1 2/2017 Fu et al.
2018/0034610 A1* 2/2018 He ........................... H04L 5/00

FOREIGN PATENT DOCUMENTS

| | | |
|---|---|---|
| CN | 102223219 A | 10/2011 |
| CN | 102573083 A | 7/2012 |
| CN | 103283173 A | 9/2013 |
| CN | 105099633 A | 11/2015 |
| EP | 2648355 A2 | 10/2013 |

OTHER PUBLICATIONS

3rd Generation Partnership Project; Technical Specification Group Radio Access Network; Evolved Universal Terrestrial Radio Access (E-UTRA); Physical layer procedures (Release 13), 3GPP TS 36.213 V13.0.1 (Jan. 2016), 326 pages.
Huawei et al., "Open issues on HARQ-ACK transmission for eCA," 3GPP TSG RAN WG1 Meeting #84 R1-160286, St. Julian's, Malta, Feb. 15-19, 2016, 6 pages.

* cited by examiner

METHOD AND APPARATUS FOR FEEDING BACK HYBRID AUTOMATIC REPEAT REQUEST OF DOWNLINK DATA

CROSS-REFERENCE TO RELATED APPLICATIONS

This application is a continuation of International Application No. PCT/CN2017/078094, filed on Mar. 24, 2017, which claims priority to International Application No. PCT/CN2016/077255, filed on Mar. 24, 2016. The disclosures of the aforementioned applications are hereby incorporated by reference in their entireties.

TECHNICAL FIELD

This application relates to the field of communication technologies, and in particular, to a method and an apparatus for feeding back a hybrid automatic repeat request of downlink data.

BACKGROUND

As a new generation communications technology standard, long term evolution (LTE) is increasingly widely applied. In an LTE system, a hybrid automatic repeat request (HARQ) technology is used to ensure correct data sending and receiving between a base station and a user terminal. The HARQ is a combination of an automatic repeat request (ARQ) and forward error correction (FEC), that is, to use an automatic repeat request protocol and a forward error correction technology to ensure reliable data transmission. When a data packet arrives at a receive end, error detection is performed on the data packet. If the data packet is correctly received, an acknowledgement (ACK) signal is returned and is denoted by a bit '0'; or if the data packet is incorrectly received, a negative acknowledgement (NACK) signal is returned and is denoted by a bit '1'. The ACK signal and the NACK signal are collectively referred to as HARQ bits, or may be referred to as HARQ feedback bits and HARQ responses. When receiving the ACK signal, a transmit end may send new data; otherwise, the transmit end may need to retransmit the previously transmitted data packet.

A downlink HARQ refers to a procedure in which a terminal needs to determine whether data delivered by a base station is correctly received. In a current carrier aggregation technology for a plurality of carriers, a dynamic HARQ codebook is usually used to reduce a size of a HARQ feedback codebook. However, when downlink transmission includes a physical downlink shared channel (PDSCH) transmission in a configured periodic semi-persistent scheduling (SPS) subframe, a current dynamic HARQ codebook cannot make a response concerning whether data of SPS downlink transmission is correctly received.

SUMMARY

Embodiments of this application provide a method and an apparatus for a hybrid automatic repeat request (HARQ) feedback of downlink data, so as to make a correct receiving response for semi-persistent scheduling (SPS) downlink transmission and extend an applicable scope of a dynamic HARQ.

According to a first aspect, a method for a HARQ feedback is provided. A terminal receives downlink data of a physical downlink shared channel (PDSCH) and downlink data of a physical downlink control channel (PDCCH) or enhanced physical downlink control channel (EPDCCH) from a base station. The terminal determines a size of a HARQ feedback codebook based on a state of a semi-persistent scheduling (SPS) PDSCH transmission and a total downlink assignment indicator in the downlink data of the PDCCH or the EPDCCH. The HARQ feedback codebook includes a HARQ bit for the SPS PDSCH transmission. And the terminal sends the HARQ feedback codebook to the base station.

According to a second aspect, a method implemented by a base station is provided. The base station sends downlink data of a physical downlink shared channel (PDSCH) and downlink data of a physical downlink control channel (PDCCH) or an enhanced physical downlink control channel (EPDCCH) to a terminal. The base station receives a hybrid automatic repeat request (HARQ) feedback codebook from the terminal, wherein a size of the HARQ feedback codebook is based on a state of a semi-persistent scheduling (SPS) PDSCH transmission and a total downlink assignment indicator in the downlink data of the PDCCH or the EPDCCH, and the HARQ feedback codebook comprises a HARQ bit for the SPS PDSCH transmission.

According to a third aspect, a terminal for HARQ feedback is provided. The terminal receives downlink data of a physical downlink shared channel (PDSCH) and downlink data of a physical downlink control channel (PDCCH) or enhanced physical downlink control channel (EPDCCH) from a base station. The terminal determines a size of a HARQ feedback codebook based on a state of a semi-persistent scheduling (SPS) PDSCH transmission and a total downlink assignment indicator in the downlink data of the PDCCH or the EPDCCH. The HARQ feedback codebook includes a HARQ bit for the SPS PDSCH transmission. And the terminal sends the HARQ feedback codebook to the base station.

According to a fourth aspect, a base station is provided. The base station sends downlink data of a physical downlink shared channel (PDSCH) and downlink data of a physical downlink control channel (PDCCH) or an enhanced physical downlink control channel (EPDCCH) to a terminal. The base station receives a hybrid automatic repeat request (HARQ) feedback codebook from the terminal, wherein a size of the HARQ feedback codebook is based on a state of a semi-persistent scheduling (SPS) PDSCH transmission and a total downlink assignment indicator in the downlink data of the PDCCH or the EPDCCH, and the HARQ feedback codebook comprises a HARQ bit for the SPS PDSCH transmission.

In technical solutions provided in this application, the size of the HARQ feedback codebook is determined based on the downlink data, and the HARQ feedback codebook includes the HARQ bit for the PDSCH transmission without the corresponding PDCCH or EPDCCH, so as to make a correct receiving response for SPS downlink transmission and extend an applicable scope of a dynamic HARQ codebook.

BRIEF DESCRIPTION OF THE DRAWINGS

To describe the technical solutions in the embodiments of this application more clearly, the following briefly describes the accompanying drawings required for describing the embodiments.

DETAILED DESCRIPTION OF ILLUSTRATIVE EMBODIMENTS

Technical solutions provided in this application are applicable to a long term evolution (LTE) network. In a carrier aggregation technology, feedback is further performed for physical downlink shared channel (PDSCH) transmission without a corresponding physical downlink control channel (PDCCH) or enhanced physical downlink control channel (EPDCCH), so as to further improve a dynamic hybrid automatic repeat request (HARQ) codebook and extend an applicable scope of the dynamic HARQ codebook.

Figure 1:
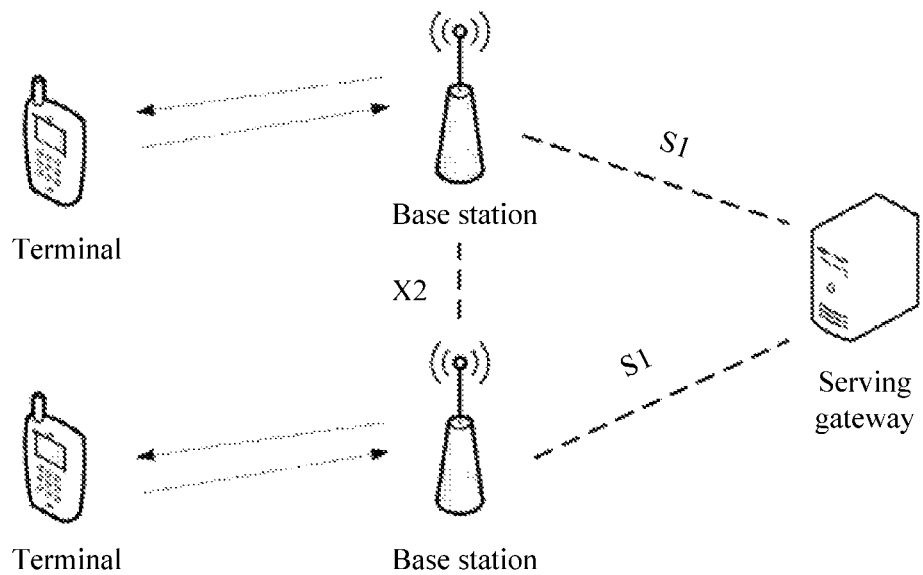
FIG. 1 is a diagram of an implementation environment of a method for feeding back a hybrid automatic repeat request (HARQ) of downlink data according to an embodiment of this application.

FIG. 1 is a diagram of an implementation environment of a method for feeding back a HARQ of downlink data according to an embodiment of this application. As shown in FIG. 1, the method for feeding back a HARQ of downlink data is applicable to an LTE communications system. In the LTE communications system, evolved NodeBs (eNBs) are in communication connection to each other, and are connected to a serving gateway (S-GW), so that a terminal (e.g., user equipment, referred to as UE) is connected to the evolved NodeB to perform communication. The terminal receives downlink data delivered by the evolved NodeB, and sends a HARQ feedback codebook to the evolved NodeB based on the downlink data, so that the evolved NodeB determines whether the delivered data is correctly received by the terminal.

Figure 2:
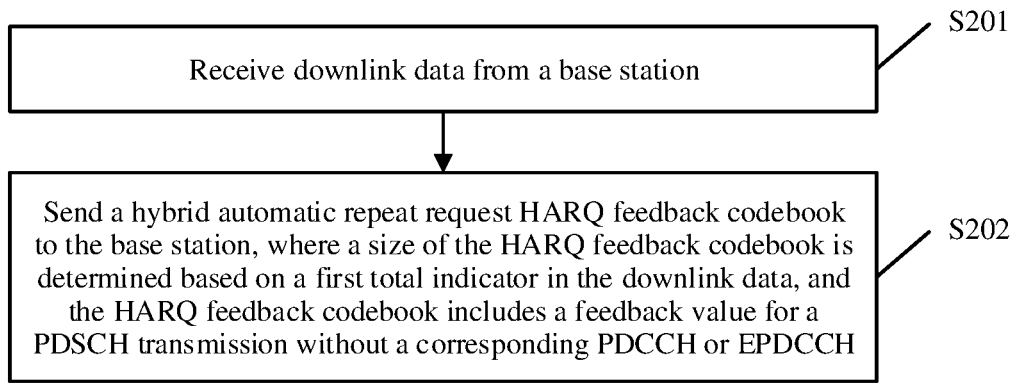
FIG. 2 is a flowchart of a method for feeding back a HARQ of downlink data according to an embodiment of this application.

FIG. 2 is a flowchart of a method for feeding back a HARQ of downlink data according to an embodiment of this application. In this implementation, the method is applied to a terminal, and the method includes the following steps S201 and S202.

Step S201: Receive downlink data from a base station.

In this step, the terminal receives the downlink data from the base station, and the downlink data includes data on a PDSCH and either a PDCCH or an EPDCCH delivered by the base station to the terminal. The PDCCH or the EPDCCH may carry information used to indicate downlink semi-persistent scheduling (SPS) activation; and in this case, the PDCCH or the EPDCCH is corresponding to a PDSCH resource, and either the PDCCH or the EPDCCH and a corresponding PDSCH are transmitted in one subframe. Alternatively, the PDCCH or the EPDCCH may carry information used to indicate downlink SPS release; and in this case, the PDCCH or the EPDCCH does not specify a PDSCH resource. The PDSCH may be a PDSCH sent in a configured periodic SPS subframe; and in this case, the PDSCH is not transmitted with the PDCCH, and may be referred to as a PDSCH without a corresponding PDCCH or EPDCCH, or may be referred to as an SPS PDSCH. The PDSCH may further be a PDSCH associated with the PDCCH or the EPDCCH. In a current technology, the terminal sends a HARQ feedback bit to only the PDSCH associated with the PDCCH or the EPDCCH, and the PDCCH or the EPDCCH used to indicate downlink SPS release. In this embodiment, a corresponding HARQ feedback bit is also generated for a PDSCH that is sent in the periodic SPS subframe and that is not corresponding to a PDCCH or an EPDCCH, and therefore, an applicable scope of dynamic HARQ feedback is extended. The HARQ feedback bit that is sent in the periodic SPS subframe and that is corresponding to the PDSCH without the corresponding PDCCH or EPDCCH may sometimes be referred to as a HARQ feedback bit for the SPS PDSCH transmission.

Step S202: Send a HARQ feedback codebook to the base station. The size of the HARQ feedback codebook is determined based on a first total indicator in the downlink data. The first total indicator is used to denote the total number of serving cells with PDSCH transmission and serving cells with a PDCCH or an EPDCCH used to indicate downlink SPS release in one subframe, or the first total indicator is used to denote the total number of {serving cell, subframe}-pairs in which PDSCH transmission or the PDCCH or the EPDCCH used to indicate downlink SPS release is present, up to a current subframe in at least one subframe. The HARQ feedback codebook includes a HARQ bit for a PDSCH transmission without a corresponding PDCCH or EPDCCH.

It should be noted that the HARQ feedback codebook refers to a group of sequential HARQ feedback bits, and the size of the HARQ feedback codebook refers to the number of HARQ feedback bits. In this step, after the downlink data is received from the base station, PDCCH or EPDCCH data in the downlink data is parsed, to obtain downlink control information (DCI) in the PDCCH or EPDCCH data. The DCI includes the first total indicator. LTE networks are classified into frequency division duplex LTE (FDD-LTE) and time division duplex LTE (TDD-LTE), and DCI in different network modes is different. The following separately provides description.

In an implementation, the LTE network is an FDD-LTE network, and the first total indicator is used to denote the total number of the serving cells with PDSCH transmission and the serving cells with the PDCCH or the EPDCCH used to indicate downlink SPS release in the subframe. Different from a total downlink assignment indicator (DAI) in the current technology that is used to denote only the total number of serving cells with PDSCH transmission associated with the PDCCH or the EPDCCH and serving cells with a PDCCH or an EPDCCH used to indicate the downlink SPS release, the first total indicator denotes a total number of serving cells with PDSCH transmission, regardless of whether the PDSCH is associated with the PDCCH or the EPDCCH. Therefore, statistics about the PDSCH transmission without the corresponding PDCCH or EPDCCH may be further collected based on the first total indicator.

In another implementation, the LTE network is a TDD-LTE network, and because in this case some uplink subframes need to feed back HARQ bits of a plurality of downlink subframes and some uplink subframes are corresponding to the HARQ bit of only one downlink subframe, in this case, the first total indicator is used to denote the total number of the {serving cell, subframe}-pairs in which PDSCH transmission or the PDCCH or the EPDCCH used to indicate downlink SPS release is present, up to a current subframe in at least one subframe. It may be understood that the at least one subframe may be corresponding to at least one downlink subframe in one TDD uplink subframe feedback window, and one serving cell is corresponding to one carrier. Different from the total DAI in the current technology that is used to denote only the total number of the {serving cell, subframe}-pairs in which PDSCH transmission associated with the PDCCH or the EPDCCH, or the PDCCH or the EPDCCH used to indicate downlink SPS release is present, the first total indicator denotes a total number of {serving cell, subframe}-pairs with PDSCH transmission, regardless of whether the PDSCH is associated with the PDCCH or the EPDCCH. Therefore, statistics about the PDSCH transmission without the corresponding PDCCH or EPDCCH may be further collected based on the first total indicator.

After the first total indicator is obtained, the size of the HARQ feedback codebook is determined based on the first total indicator. A person skilled in the art may understand that the size of the HARQ feedback codebook is related to the first total indicator and a transmission mode (TM) of each carrier. The TM of each carrier determines the maximum number of transport blocks (TBs) supported by the carrier, i.e., the maximum number of codewords (CWs) supported by the carrier. The size of the HARQ feedback codebook is a product of the first total indicator and the maximum number of CWs in a plurality of aggregated carriers. The maximum number of CWs in LTE is 2. In other words, if at least one of the plurality of aggregated carriers supports a maximum of two CWs, the size of the HARQ feedback codebook is equal to a product obtained by multiplying the first total indicator by 2; otherwise, the size of the HARQ feedback codebook is the first total indicator.

In this step, the DCI that includes the first total indicator is carried in a DCI format used for downlink assignment, for example, a DCI format 1/1A/1B/1D/2/2A/2B/2C/2D.

In this step, because statistics about the number of serving cells in which the PDSCH transmission without a corresponding PDCCH or EPDCCH is present is further collected based on the first total indicator, the HARQ feedback codebook further includes a HARQ bit for the PDSCH transmission without a corresponding PDCCH or EPDCCH. It may be understood that the HARQ bit for the PDSCH transmission without the corresponding PDCCH or EPDCCH is generated depending on whether the PDSCH without the corresponding PDCCH or EPDCCH is successfully decoded.

In an implementation, the HARQ bit for the PDSCH transmission without the corresponding PDCCH or EPDCCH is a last bit of the HARQ feedback codebook. It may be understood that the DCI may further include a counter downlink assignment indicator (DAI) when the DCI in the downlink data is obtained. In the FDD-LTE mode, the counter DAI is used to denote the accumulative number of serving cells with a PDSCH associated with the PDCCH or the EPDCCH and serving cells with the PDCCH or the EPDCCH used to indicate downlink SPS release, up to a current serving cell in ascending order of serving cell indexes in one subframe. In the TDD-LTE mode, the counter DAI is used to denote the accumulative number of {serving cell, subframe}-pairs in which PDSCH transmission associated with the PDCCH or the EPDCCH, or the PDCCH or the EPDCCH used to indicate downlink SPS release is present, up to a current serving cell and a current subframe, first in ascending order of serving cell indexes and then in ascending order of subframe numbers in at least one subframe. After the counter DAI is obtained, a sequence of bits, other than the HARQ bit for the PDSCH transmission without the corresponding PDCCH or EPDCCH, in the HARQ feedback codebook is determined based on a value of the counter DAI, and the HARQ bit for the PDSCH transmission without the corresponding PDCCH or EPDCCH is used as a last bit of the HARQ feedback codebook. The DCI is carried in a DCI format used for downlink assignment, for example, a DCI format 1/1A/1B/1D/2/2A/2B/2C/2D.

In another implementation, the HARQ bit for the PDSCH transmission without the corresponding PDCCH or EPDCCH is a first bit of the HARQ feedback codebook. In this implementation, after the counter DAI is obtained, the number of HARQ bits for the PDSCH transmission without the corresponding PDCCH or EPDCCH is first determined. It may be understood that the number of the HARQ bits for the PDSCH transmission without the corresponding PDCCH or EPDCCH is related to the maximum number of CWs supported by the plurality of aggregated carriers, and then a valid HARQ bit for the PDSCH transmission without the corresponding PDCCH or EPDCCH is used as the first bit of the HARQ feedback codebook. Then, a location of each remaining bit in the HARQ feedback codebook is determined based on the number of the HARQ bits for the PDSCH transmission without the corresponding PDCCH or EPDCCH, and the counter downlink assignment indicator counter DAI.

It should be noted that the valid HARQ bit for the PDSCH transmission without the corresponding PDCCH or EPDCCH is one bit, and when the number of the HARQ bits for the PDSCH transmission without the corresponding PDCCH or EPDCCH is 2, another HARQ bit needs to be set to NACK, that is, a value of 0, to serve as a trailing bit. The HARQ bit in a last location or a first location is the valid HARQ bit for the PDSCH transmission without the corresponding PDCCH or EPDCCH.

Figure 3:
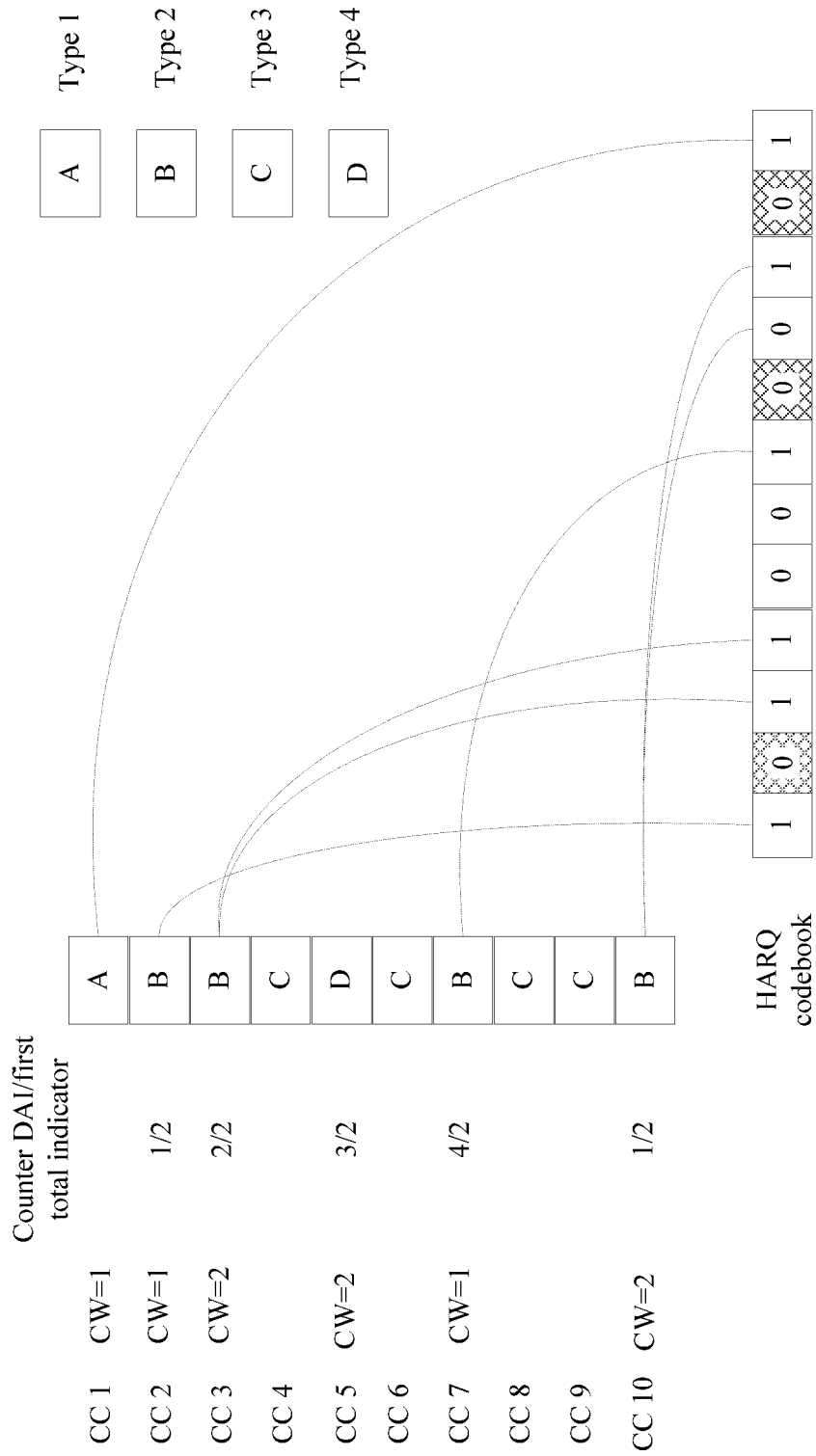
FIG. 3 is a schematic diagram of a HARQ codebook generation in the method shown in FIG. 2.

The following provides description with reference to FIG. 3. FIG. 3 is a schematic diagram of HARQ codebook generation according to an embodiment of this application. In this embodiment, the FDD-LTE mode is used as an example for description.

As shown in FIG. 3, one subframe includes a plurality of component carriers (CCs), and the component carriers are denoted by CC 1 to CC 10 in the figure. Each component carrier is a carrier, and is also a serving cell. A value of a CW in the figure denotes the number of TBs supported by a corresponding carrier TM, i.e., the maximum number of codewords supported by the carrier. The figure further shows four types of downlink data transmission: type 1, type 2, type 3, and type 4, which are respectively denoted by A, B, C, and D in the figure. The type 1 represents the PDSCH sent in a downlink SPS subframe, and the PDSCH is not corresponding to a PDCCH or an EPDCCH. The type 2 represents downlink data of the PDSCH associated with a PDCCH or an EPDCCH. The type 3 indicates that no downlink data scheduling is performed, that is, no downlink data is sent. The type 4 represents downlink data of the PDSCH associated with a PDCCH or an EPDCCH, but receiving of the PDCCH or the EPDCCH fails. Compared with the total DAI in the current technology that includes statistics about only the number of serving cells in which downlink data of the type 2 and the type 4 is present, in this embodiment, the first total indicator further includes statistics about the number of serving cells in which downlink data of the type 1 is present. As shown in the figure, the total number of the serving cells in which the downlink data of the type 1, the type 2, and the type 4, i.e., A, B, and D, is present is 6. Therefore, a value of the first total indicator is 6, and then the size of the HARQ codebook is determined based on the first total indicator. It may be understood that, considering a limitation of bits in the DCI, the counter DAI and the first total indicator are expressed by using two bits. Therefore, a modulo operation needs to be performed on the counter DAI and the first total indicator. A modulo operation formula is obtained by first subtracting 1 from an original value M, then performing the modulo operation on 4, and then adding 1 (i.e., mod(M−1, 4)+1). A value of the HARQ bit corresponding to each carrier is determined based on a decoding status of a TB block in downlink data of each carrier. If decoding succeeds, the bit is 1; or if decoding fails, the bit is 0. In addition, considering that the size of the HARQ feedback codebook is related to the maximum number of CWs supported by the aggregated carrier, in this example, a plurality of carriers CC 3, CC 5, and CC 10 support a maximum of two TBs, each carrier with downlink scheduling is corresponding to two HARQ bits. For a serving cell that supports only one CW, a HARQ bit without TB decoding information needs to be further padded accordingly. In addition, for downlink transmission of the type 4, because receiving of the PDCCH or the EPDCCH fails, a loss of downlink data of one carrier may be determined by obtaining counting information of the counter DAI. Therefore, two HARQ bits corresponding to the carrier need to be padded. A bit filled with grids in the figure denotes a trailing bit, and another bit is a valid HARQ bit. Corresponding values are provided as an example in FIG. 3.

In different implementations, the HARQ bit that is determined based on the type 1 of downlink data and that is for the PDSCH transmission without the corresponding PDCCH or EPDCCH, may be a last bit of the HARQ codebook, or may be a first bit of the HARQ codebook. When the HARQ bit for the PDSCH transmission without the corresponding PDCCH or EPDCCH is the last bit of the HARQ codebook, if the number of HARQ bits for the PDSCH transmission without the corresponding PDCCH or EPDCCH is 2, another bit needs to be padded with 0. As shown in FIG. 3, the last bit of the HARQ codebook is a valid HARQ bit for the PDSCH transmission without the corresponding PDCCH or EPDCCH, and a previous bit is a trailing bit. When the HARQ bit for the PDSCH transmission without the corresponding PDCCH or EPDCCH is the first bit of the HARQ codebook, the HARQ bit, as the first bit, is a valid HARQ bit for the PDSCH transmission without the corresponding PDCCH or EPDCCH, and in this case, if the number of HARQ bits for the PDSCH transmission without the corresponding PDCCH or EPDCCH is 2, a second bit is a trailing bit.

Figure 4:
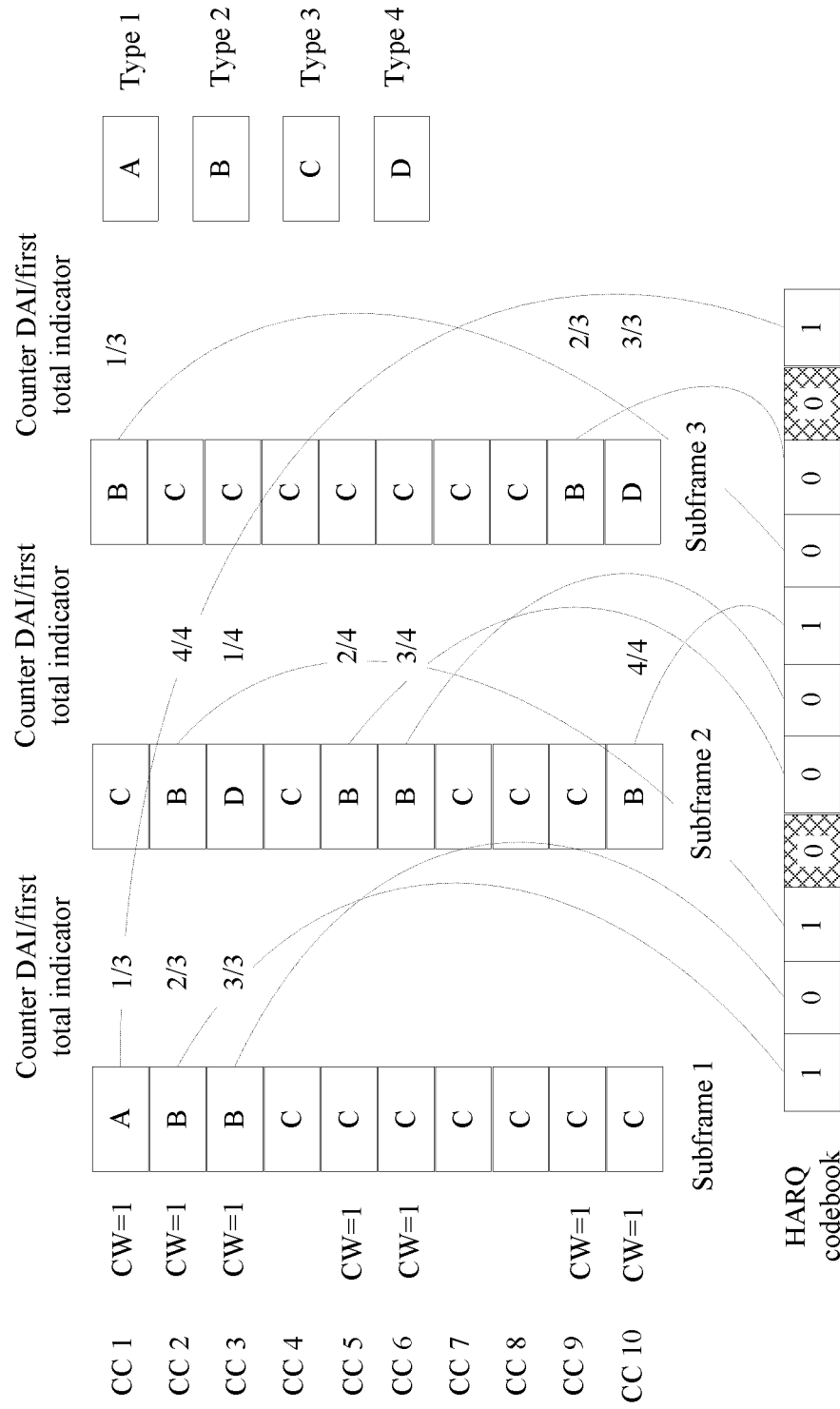
FIG. 4 is a schematic diagram of another HARQ codebook generation in the method shown in FIG. 2.

The following provides description with reference to FIG. 4. FIG. 4 is a schematic diagram of HARQ codebook generation in Embodiment 1 of a method for feeding back a hybrid automatic repeat request of downlink data according to an embodiment of this application. In this embodiment, the TDD-LTE mode is used as an example for description.

As shown in FIG. 4, a same TDD uplink/downlink configuration is used for a plurality of aggregated carriers, and a shown feedback window corresponding to one uplink subframe (the uplink subframe is not shown in the figure) includes three downlink subframes. In the figure, the three downlink subframes in the feedback window are denoted by subframe 1, subframe 2, and subframe 3. The figure further shows a plurality of CCs that are denoted by CC 1 to CC 10. Each component carrier is a carrier, and is also a serving cell. Each rectangular block in the figure represents a {serving cell, subframe}-pair, that is, each rectangular block is corresponding to one carrier and one subframe number. The figure further shows four types of downlink data transmission: type 1, type 2, type 3, and type 4, which are respectively denoted by A, B, C, and D in the figure. The type 1 represents the PDSCH sent in a downlink SPS subframe, and the PDSCH is not corresponding to a PDCCH or an EPDCCH. The type 2 represents downlink data of the PDSCH associated with a PDCCH or an EPDCCH. The type 3 indicates that no downlink data scheduling is performed, that is, no downlink data is sent. The type 4 represents downlink data of the PDSCH associated with a PDCCH or an EPDCCH, but receiving of the PDCCH or the EPDCCH fails. Compared with the total DAI in the current technology that includes statistics about only the number of serving cells in which downlink data of the type 2 and the type 4 is present, in this embodiment, the first total indicator further includes statistics about the number of serving cells in which downlink data of the type 1 is present. As shown in the figure, in a subframe 1, the number of serving cells in which downlink data of the type 1, the type 2, and the type 4 is present is 3, and therefore, in the subframe 1, a first total indicator is 3, and counter DAIs are 1 to 3. In a subframe 2, the number of serving cells in which downlink data of the type 1, the type 2, and the type 4 is present is 5, in this case, a first total indicator is the total number of subframes 1 plus the total number of subframes 2 and is equal to 8, and counter DAIs are 4 to 8. In a subframe 3, the number of serving cells in which downlink data of the type 1, the type 2, and the type 4 is present is 3, in this case, a first total indicator is the total number of subframes 1 plus the total number of subframes 2 and the total number of subframes 3 and is equal to 11, and counter DAIs are 9 to 11. It may be understood that, considering a limitation of bits in the DCI, the counter DAI and the first total indicator are expressed by using only two bits. Therefore, a modulo operation needs to be performed on the counter DAI and the first total indicator. A modulo operation formula is obtained by first subtracting 1 from an original value M, then performing the modulo operation on 4, and then adding 1 (i.e, mod(M−1, 4)+1). Therefore, in the figure, a result obtained by calculating the first total indicator 3 corresponding to the subframe 1 is still 3; a result obtained by calculating the first total indicator 8 of the subframe 2 is 4; and a result obtained by calculating the first total indicator ii of the subframe 3 is 3. A principle for calculating a value of the counter DAI in the figure is the same. A value of a valid HARQ bit is determined based on a decoding state of a TB block in downlink data of each carrier. If decoding succeeds, the bit is 1; or if decoding fails, the bit is 0. In addition, considering that a size of the HARQ feedback codebook is related to the maximum number of CWs supported by the aggregated carrier, if at least one of the aggregated carriers supports a maximum of two CWs, for a serving cell that supports only one CW, a HARQ bit without TB decoding information further needs to be padded accordingly. When all carriers in FIG. 4 support only one CW, for a carrier that supports only one CW, no additional trailing bit is required. For downlink transmission of the type 4 in the subframe 2, because receiving of the PDCCH or the EPDCCH fails, a loss of downlink data of one carrier may be determined by obtaining counting information of the counter DAI. Therefore, one HARQ bit corresponding to the carrier needs to be padded. A bit filled with grids in the figure denotes a trailing bit, and another bit is a valid HARQ bit. A corresponding value is provided as an example in FIG. 4. In different implementations, the HARQ bit that is determined based on the type 1 of downlink data and that is for the PDSCH transmission without the corresponding PDCCH or EPDCCH may be a last bit of the HARQ codebook, or may be a first bit of the HARQ codebook. FIG. 4 provides only an example in which the HARQ bit is the last bit.

According to the method for feeding back a HARQ of downlink data in this embodiment of this application, a size of the HARQ feedback codebook is determined based on the first total indicator in the downlink data, and the HARQ feedback codebook includes the HARQ bit for the PDSCH transmission without the corresponding PDCCH or EPDCCH, so as to make a correct receiving response for SPS downlink transmission and extend an applicable scope of a dynamic HARQ codebook.

Figure 5:
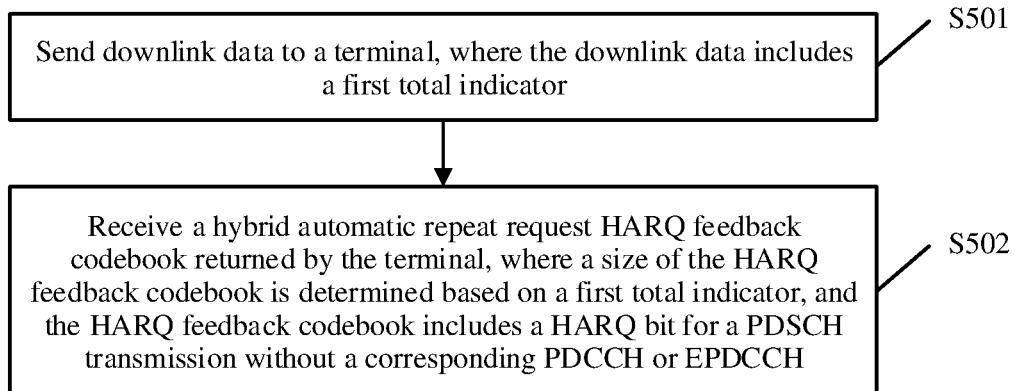
FIG. 5 is a flowchart of a method for feeding back a HARQ of downlink data according to an embodiment of this application.

FIG. 5 is a flowchart of a method for feeding back a hybrid HARQ of downlink data according to an embodiment of this application. In this implementation, the method is applied to a base station, and the method includes the following steps S501 and S502.

Step S501: Send downlink data to a terminal. The downlink data includes a first total indicator. The first total indicator is used to denote the total number of serving cells with PDSCH transmission and serving cells with PDCCH or EPDCCH used to indicate downlink SPS release in one subframe, or is used to denote the total number of {serving cell, subframe}-pairs in which PDSCH transmission or the PDCCH or the EPDCCH used to indicate downlink SPS release is present, up to a current subframe in at least one subframe.

In this step, the base station sends the downlink data to the terminal, and the downlink data includes data on either a PDCCH or an EPDCCH, and a PDSCH delivered to the terminal.

Step S502: Receive a hybrid automatic repeat request HARQ feedback codebook returned by the terminal. A size of the HARQ feedback codebook is determined based on a first total indicator, and the HARQ feedback codebook includes a HARQ bit for a PDSCH transmission without a corresponding PDCCH or EPDCCH.

In this step, the terminal generates the HARQ feedback codebook based on a receiving state of the downlink data. The downlink data sent by the base station to the terminal includes the first total indicator, and the terminal determines the size of the HARQ feedback codebook based on the first total indicator. The first total indicator is used to denote the total number of the serving cells with PDSCH transmission and the serving cells with PDCCH or EPDCCH used to indicate downlink semi-persistent scheduling SPS release in the subframe, or is used to denote the total number of the {serving cell, subframe}-pairs in which PDSCH transmission or the PDCCH or the EPDCCH used to indicate downlink SPS release is present, up to the current subframe in the at least one subframe. The HARQ feedback codebook includes the HARQ bit for the PDSCH transmission without the corresponding PDCCH or EPDCCH.

It may be understood that the method for feeding back a HARQ of downlink data in this embodiment is applied to a base station, and is corresponding to the method applied to the terminal in Embodiment 1 shown in FIG. 2. Details are not described herein again.

Figure 6:
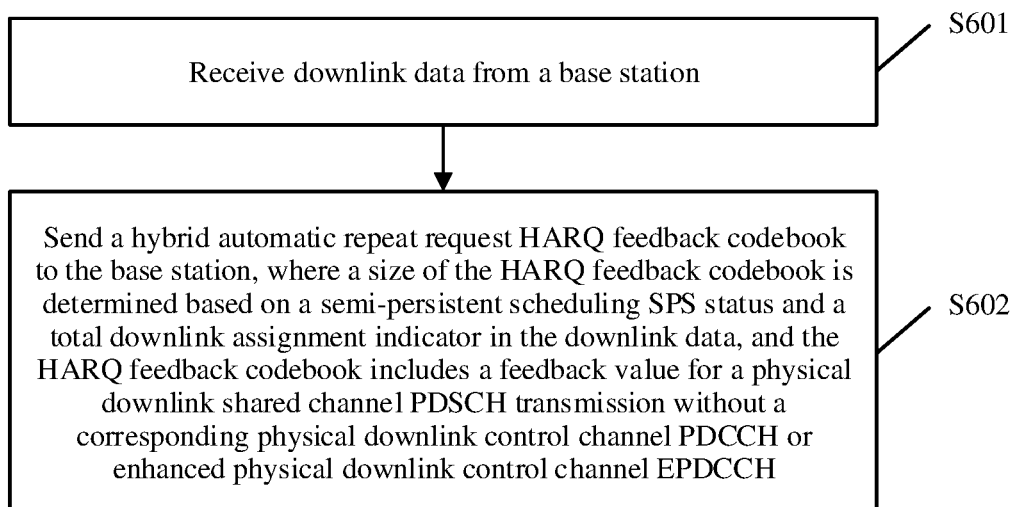
FIG. 6 is a flowchart of a method for feeding back a HARQ of downlink data according to an embodiment of this application.

FIG. 6 is a flowchart of a method for feeding back a HARQ of downlink data according to an embodiment of this application. In this implementation, the method is applied to a terminal, and the method includes the following steps S601 and S602.

Step S601: Receive downlink data from a base station.

In other words, in S601, the base station sends the downlink data to the terminal.

Step S602: Send a HARQ feedback codebook to the base station, where a size of the HARQ feedback codebook is determined based on an SPS state and a total downlink assignment indicator in the downlink data. The HARQ feedback codebook includes a HARQ bit for a PDSCH transmission without a corresponding PDCCH or EPDCCH. In other words, the HARQ feedback codebook includes a HARQ bit for an SPS PDSCH transmission. The SPS state may also be understood as a state of the SPS PDSCH transmission.

In other words, in S602, the base station receives the HARQ feedback codebook from the terminal.

In this step, after the downlink data is received, DCI in the downlink data is obtained, and the DCI includes a total DAI. In an FDD-LTE mode, the total DAI is used to denote the total number of serving cells with PDSCH transmission associated with the PDCCH or the EPDCCH and serving cells with a PDCCH or an EPDCCH used to indicate downlink SPS release. In a TDD-LTE mode, the total DAI is used to denote the total number of {serving cell, subframe}-pairs in which PDSCH transmission associated with the PDCCH or the EPDCCH, or the PDCCH or the EPDCCH used to indicate downlink SPS release is present. In addition, the SPS state further needs to be determined. A size of the HARQ feedback codebook is determined based on both the SPS state and the total DAI.

In this step, the base station may also learn the size of the HARQ feedback codebook in the foregoing manner, and further, data is retransmitted or new data is transmitted based on information that is fed back in the HARQ feedback codebook.

Generally, an SPS process is divided into several steps: SPS configuration, SPS activation, and SPS deactivation.

SPS configuration information is as follows:

| SPS-Config information element | | | | |
|---|---|---|---|---|
| -- ASN1START | | | | |
| SPS-Config ::= SEQUENCE { | | | | |
| | semiPersistSchedC-RNTI | C-RNTI | OPTIONAL, | -- |
| Need OR | | | | |
| | sps-ConfigDL | SPS-ConfigDL | OPTIONAL, | -- |
| Need ON | | | | |
| | sps-ConfigUL | SPS-ConfigUL | OPTIONAL | -- |

-continued

| SPS-Config information element |
|---|
| Need ON<br>       }<br>       SPS-ConfigDL ::= CHOICE{<br>          release                      NULL,<br>          setup                        SEQUENCE {<br>            semiPersistSchedIntervalDL    ENUMERATED {<br>                                        sf10, sf20, sf32, sf40, sf64, sf80,<br>                                        sf128, sf160, sf320, sf640, spare6,<br>                                        spare5, spare4, spare3, spare2,<br>                                        spare1},<br>            numberOfConfSPS-Processes        INTEGER (1..8),<br>            n1PUCCH-AN-PersistentList        N1PUCCH-AN-PersistentList,<br>          ...,<br>          [[   twoAntennaPortActivated-r10       CHOICE {<br>                release                          NULL,<br>                setup                            SEQUENCE {<br>                n1PUCCH-AN-PersistentListP1-r10    N1PUCCH-AN-PersistentList<br>                }<br>            }                                       OPTIONAL  -- Need ON<br>          ]]<br>      }<br>   }<br>  ......<br>-- ASN1STOP |

The foregoing shows detailed SPS configuration information (a downlink SPS configuration is used as an example). In SPS-ConfigDL, "release" indicates that downlink SPS is not configured, and "setup" indicates that downlink SPS is configured. If SPS is configured, an SPS configuration parameter further includes a parameter semiPersistSchedIntervalDL specifying a downlink SPS subframe interval period. The parameter is used to indicate an SPS subframe interval time (in a unit of a subframe). It should be noted that the SPS subframe refers to a subframe location that is determined by both a subframe interval period configured based on the SPS and a subframe in which SPS activation information is located, and a PDSCH sent in the subframe may be referred to as an SPS PDSCH.

For the terminal on which the SPS is configured, the SPS cannot be applied, and the SPS needs to be activated by using a PDCCH scrambled with an SPS C-RNTI. SPS data sending can be started only after the SPS is activated. Herein, for the terminal on which the SPS is configured, SPS states are classified into an activated state and a deactivated state. In other words, the SPS PDSCH may be in an activated state or a deactivated state. After an SPS activation message is received, the SPS enters the SPS activated state. After the SPS enters the SPS activated state, if an SPS deactivation message is received, the SPS returns to the SPS deactivated state. In this case, SPS data sending cannot be performed. The terminal may determine the SPS state by determining whether information used to indicate SPS activation and information used to indicate SPS deactivation are received. The SPS activated state may be understood as that a state of the SPS PDSCH transmission is activated for the terminal, and the terminal may receive the SPS PDSCH in the SPS subframe.

In an implementation, when the SPS state is the activated state, the size of the HARQ feedback codebook is equal to a size of a first codebook plus 1 bit, and the size of the first codebook is determined based on the total downlink assignment indicator. The SPS state being the activated state may indicate that the state of the SPS PDSCH transmission is the activated state and the terminal is configured to receive the SPS PDSCH in the SPS subframe.

Specifically, after the total DAI is obtained, the size of the first codebook is determined based on the total DAI. In addition, whether the SPS is in the activated state needs to be determined. If the information used to indicate SPS activation is received from the base station, it indicates that the SPS is in the activated state, and the size of the HARQ feedback codebook is equal to the size of the first codebook plus 1 bit; otherwise, the size of the first codebook is used as the size of the HARQ feedback codebook.

In another implementation, a first parameter may be configured based on a receiving state of information indicating SPS activation or deactivation. The first parameter is used to denote the SPS state or the number of HARQ bits for a PDSCH transmission without a corresponding PDCCH or EPDCCH. When the information used to indicate SPS activation is received from the base station, a value of the first parameter is 1; or when the information used to indicate SPS deactivation is received from the base station, a value of the first parameter is 0.

Specifically, the first parameter is used to denote the SPS state, and when the terminal is in an activated state, a value of the first parameter is 1; otherwise, a value of the first parameter is 0. Because the number of HARQ bits for the PDSCH transmission without the corresponding PDCCH or EPDCCH is 1 in an SPS activated state, and is 0 otherwise, the first parameter may also denote the number of HARQ bits for the PDSCH transmission without the corresponding PDCCH or EPDCCH.

An initial value of the first parameter is 0. When the information used to indicate SPS activation is received from the base station, the value of the first parameter is set to 1; or when the information used to indicate SPS deactivation is received from the base station, the value of the first parameter is set to 0. When the value of the first parameter is greater than 0, the size of the HARQ feedback codebook is equal to the size of the first codebook plus 1 bit, and the size of the first codebook is determined based on the total DAI.

In this step, when the information used to indicate SPS activation is received, one bit is added to the original HARQ codebook. It may be understood that the added one bit is the HARQ bit for the PDSCH transmission without the corresponding PDCCH or EPDCCH. When the terminal is in the SPS activated state and receives downlink SPS data, the HARQ bit for the PDSCH transmission without the corresponding PDCCH or EPDCCH is generated depending on whether the PDSCH without the corresponding PDCCH or EPDCCH is successfully decoded. When UE is in the SPS activated state, but receives no downlink SPS data, the HARQ bit for the PDSCH transmission without the corresponding PDCCH or EPDCCH is set to NACK, i.e., 'o'.

In an implementation, the HARQ bit for the PDSCH transmission without the corresponding PDCCH or EPDCCH is a last bit of the HARQ feedback codebook. It may be understood that the DCI may further include a counter DAI when the DCI in the downlink data is obtained. In the FDD-LTE mode, the counter DAI is used to denote the accumulative number of serving cells with a PDSCH associated with the PDCCH or the EPDCCH and serving cells with the PDCCH or the EPDCCH used to indicate downlink SPS release, up to a current serving cell in ascending order of serving cell indexes in one subframe. In the TDD-LTE mode, the counter DAI is used to denote the accumulative number of {serving cell, subframe}-pairs in which the PDSCH associated with the PDCCH or the EPDCCH, or the PDCCH or the EPDCCH used to indicate downlink SPS release is present, up to a current serving cell and a current subframe, first in ascending order of serving cell indexes and then in ascending order of subframe numbers in at least one subframe. After the counter DAI is obtained, a sequence of bits, other than the HARQ bit for the PDSCH transmission without the corresponding PDCCH or EPDCCH, in the HARQ feedback codebook is determined based on the counter DAI, and the HARQ bit for the PDSCH transmission without the corresponding PDCCH or EPDCCH is used as a last bit of the HARQ feedback codebook.

In another implementation, the HARQ bit for the PDSCH transmission without the corresponding PDCCH or EPDCCH is a first bit of the HARQ feedback codebook. In this implementation, the number of HARQ bits for the PDSCH transmission without the corresponding PDCCH or EPDCCH is only 1 in the SPS activated state, and the HARQ bit for the PDSCH transmission without the corresponding PDCCH or EPDCCH is used as the first bit of the HARQ feedback codebook. Then, a location of another bit in the HARQ feedback codebook is determined based on the number of the HARQ bits for the PDSCH transmission without the corresponding PDCCH or EPDCCH and the obtained counter downlink assignment indicator counter DAI.

Figure 7:
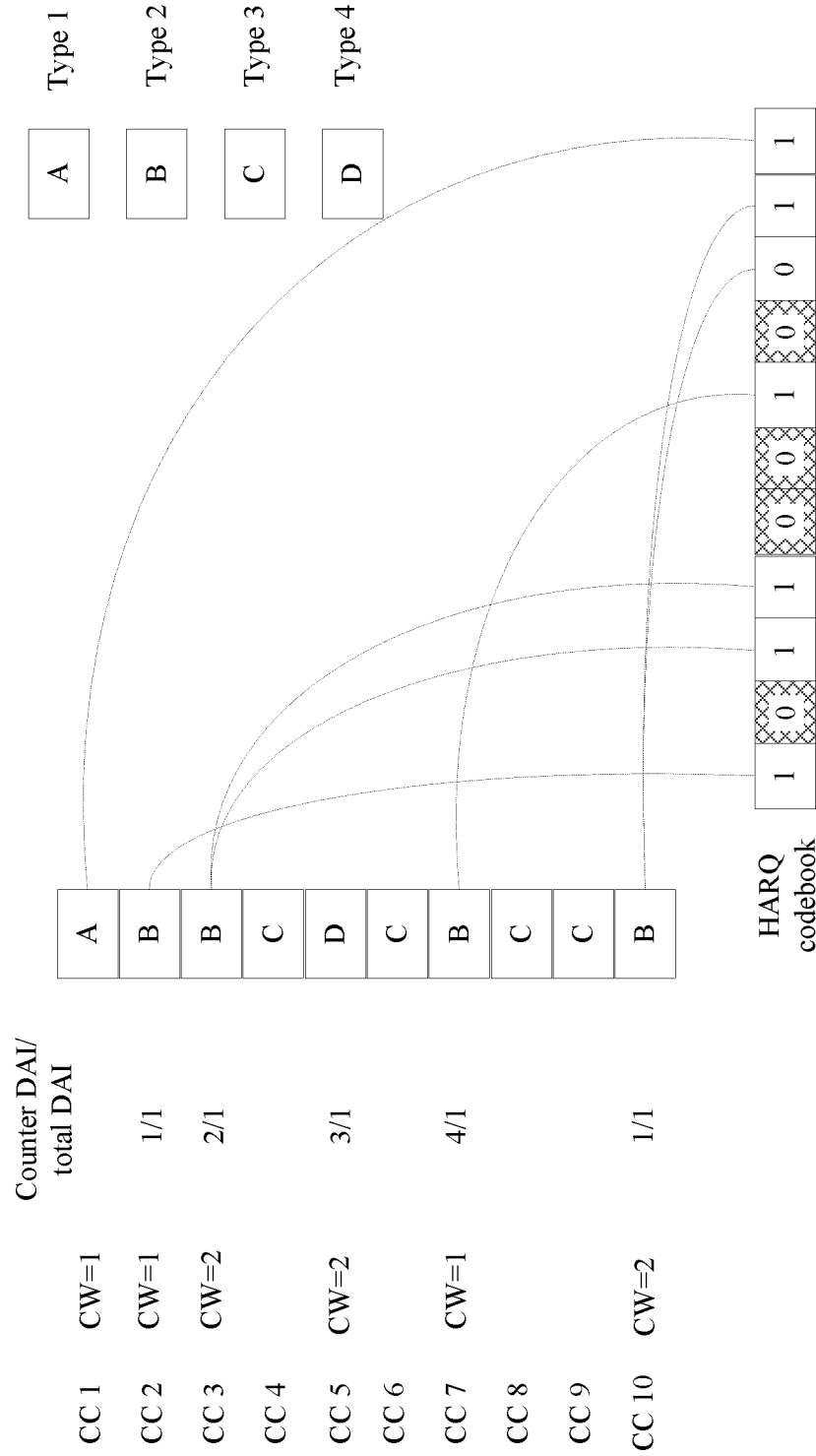
FIG. 7 is a schematic diagram of a HARQ codebook generation in the method shown in FIG. 6.

The following provides description with reference to FIG. 7. FIG. 7 is a schematic diagram of HARQ codebook generation in Embodiment 3 of a method for feeding back a HARQ of downlink data according to an embodiment of this application. In this embodiment, the FDD-LTE mode is used as an example for description. A person skilled in the art may understand that the method for feeding back a HARQ of downlink data in this embodiment may also be applied to the TDD-LTE.

As shown in FIG. 7, one subframe includes a plurality of CCs, and the component carriers are denoted by CC 1 to CC 10 in the figure. Each component carrier is a carrier, and is also a serving cell. The figure further shows four types of downlink data transmission: type 1, type 2, type 3, and type 4. The type 1 represents that the PDSCH is sent in a downlink SPS subframe, and the PDSCH is not corresponding to a PDCCH or an EPDCCH. The type 2 represents downlink data of the PDSCH associated with a PDCCH or an EPDCCH. The type 3 indicates that no scheduling is performed, that is, no downlink data is sent. The type 4 represents downlink data of the PDSCH associated with a PDCCH or an EPDCCH, but receiving of the PDCCH or the EPDCCH fails. In this implementation, a counter DAI and a total DAI are the same as those in the current technology. In this embodiment, a size of the HARQ feedback codebook is determined based on whether information used to indicate SPS activation is received and the total DM. When the information used to indicate SPS activation is received, one bit is added to the size of the first codebook that is determined based on the total DAI. The one bit is used to store a HARQ bit for a PDSCH transmission without a corresponding PDCCH or EPDCCH. It may be understood that the HARQ bit for the PDSCH transmission without the corresponding PDCCH or EPDCCH is obtained through decoding for a carrier 1. In different implementations, the HARQ bit that is determined based on the type 1 of downlink data and that is for the PDSCH transmission without the corresponding PDCCH or EPDCCH may be a last bit of the HARQ codebook, or may be a first bit of the HARQ codebook. FIG. 7 provides only an example in which the HARQ bit for the PDSCH transmission without the corresponding PDCCH or EPDCCH may be the last bit of the HARQ codebook.

According to the method for feeding back a HARQ of downlink data in this embodiment of this application, the size of the HARQ feedback codebook is determined based on a receiving state of the information used to indicate SPS activation in the downlink data and the total DAI, and the HARQ feedback codebook includes the HARQ bit for the PDSCH transmission without the corresponding PDCCH or EPDCCH, so as to make a correct receiving response for SPS downlink transmission and extend an applicable scope of a dynamic HARQ codebook.

Figure 8:
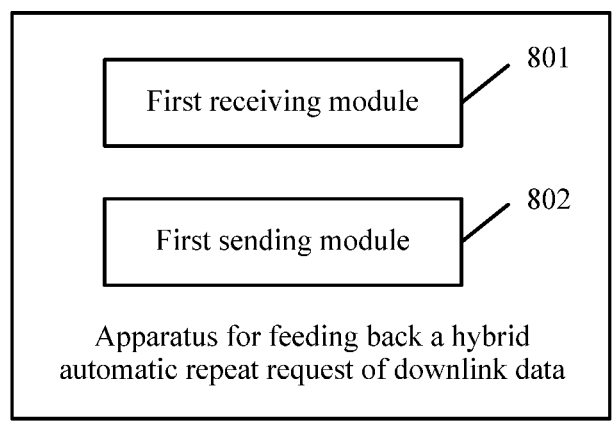
FIG. 8 is a schematic structural diagram of an apparatus for feeding back a HARQ of downlink data according to an embodiment of this application.

FIG. 8 is a schematic structural diagram of an apparatus for feeding back a HARQ of downlink data according to an embodiment of this application. In this implementation, the apparatus may include:

a first receiving module 801, configured to receive downlink data from a base station; and a first sending module 802, configured to send a hybrid automatic repeat request HARQ feedback codebook to the base station.

A size of the HARQ feedback codebook is determined based on a first total indicator in the downlink data.

The first total indicator is used to denote the total number of serving cells with PDSCH transmission and serving cells with either PDCCH or EPDCCH used to indicate downlink SPS release in one subframe, or is used to denote the total number of {serving cell, subframe}-pairs in which PDSCH transmission or the PDCCH or the EPDCCH used to indicate downlink SPS release is present, up to a current subframe in at least one subframe.

The HARQ feedback codebook includes a HARQ bit for a PDSCH transmission without a corresponding PDCCH or EPDCCH.

Optionally, the HARQ bit for the PDSCH transmission without the corresponding PDCCH or EPDCCH is a last bit or a first bit of the HARQ feedback codebook.

It may be understood that a function of each function module in the apparatus in this embodiment may be implemented based on the method shown in FIG. 2. For a specific implementation process, refer to related descriptions of the foregoing method embodiment. Details are not described herein again.

It may be understood that the apparatus in this embodiment may be a terminal.

According to the apparatus for feeding back a HARQ of downlink data in this embodiment of this application, the size of the HARQ feedback codebook is determined based on the first total indicator in the downlink data, and the HARQ feedback codebook includes the HARQ bit for the PDSCH transmission without the corresponding PDCCH or EPDCCH, so as to make a correct receiving response for SPS downlink transmission and extend an applicable scope of a dynamic HARQ codebook.

Figure 9:
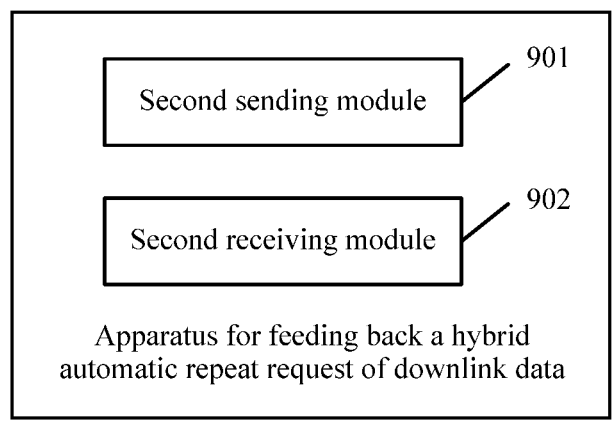
FIG. 9 is a schematic structural diagram of an apparatus for feeding back a HARQ of downlink data according to an embodiment of this application.

FIG. 9 is a schematic structural diagram of an apparatus for feeding back a HARQ of downlink data according to an embodiment of this application. In this implementation, the apparatus may include:

a second sending module 901, configured to send downlink data to a terminal; and a second receiving module 902, configured to receive a hybrid automatic repeat request HARQ feedback codebook returned by the terminal.

The downlink data includes a first total indicator, and a size of the HARQ feedback codebook is determined based on the first total indicator.

The first total indicator is used to denote the total number of serving cells with PDSCH transmission and serving cells with PDCCH or EPDCCH used to indicate downlink SPS release in one subframe, or is used to denote the total number of {serving cell, subframe}-pairs in which PDSCH transmission or the PDCCH or the EPDCCH used to indicate downlink SPS release is present, up to a current subframe in at least one subframe.

The HARQ feedback codebook includes a HARQ bit for a PDSCH transmission without a corresponding PDCCH or EPDCCH.

It may be understood that a function of each function module in the apparatus in this embodiment may be implemented based on the method shown in FIG. 5. For a specific implementation process, refer to related descriptions of the foregoing method embodiment. Details are not described herein again.

It may be understood that the apparatus in this embodiment may be a base station.

Figure 10:
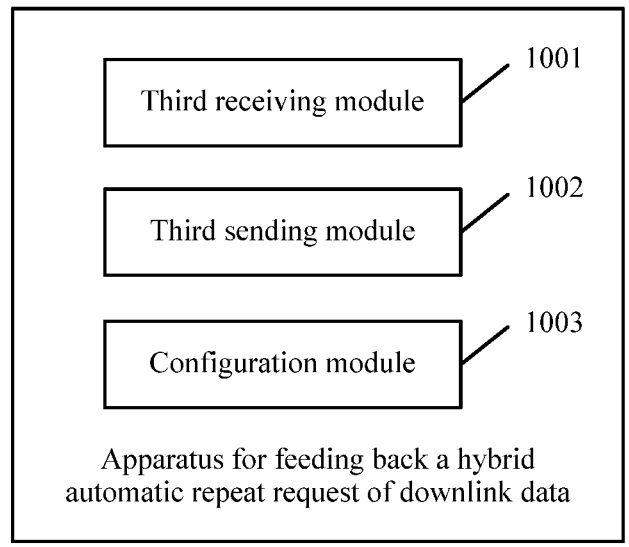
FIG. 10 is a schematic structural diagram of an apparatus for feeding back a HARQ of downlink data according to an embodiment of this application.

FIG. 10 is a schematic structural diagram of an apparatus for feeding back a HARQ of downlink data according to an embodiment of this application. In this implementation, the apparatus may include:

a third receiving module 1001, configured to receive downlink data from a base station; and a third sending module 1002, configured to send a hybrid automatic repeat request HARQ feedback codebook to the base station.

A size of the HARQ feedback codebook is determined based on a SPS state and a total downlink assignment indicator in the downlink data.

The HARQ feedback codebook includes a HARQ bit for a PDSCH transmission without a corresponding PDCCH or EPDCCH.

Optionally, when the SPS state is an activated state, the size of the HARQ feedback codebook is equal to a size of a first codebook plus 1 bit.

The size of the first codebook is determined based on the total downlink assignment indicator.

Optionally, the apparatus may further include a configuration module 1003. The configuration module 1003 is configured to configure a first parameter based on a receiving state of information indicating SPS activation or deactivation. The first parameter is used to denote the SPS state or the number of HARQ bits for the PDSCH transmission without the corresponding PDCCH or EPDCCH. When the information used to indicate SPS activation is received from the base station, a value of the first parameter is 1; or when the information used to indicate SPS deactivation is received from the base station, a value of the first parameter is 0.

Optionally, when the value of the first parameter is greater than 0, the size of the HARQ feedback codebook is equal to a size of a first codebook plus 1 bit, and the size of the first codebook is determined based on the total downlink assignment indicator.

Optionally, the HARQ bit for the PDSCH transmission without the corresponding PDCCH or EPDCCH is a last bit or a first bit of the HARQ feedback codebook.

It may be understood that a function of each function module in the apparatus in this embodiment may be implemented based on the method shown in FIG. 6 in the foregoing method embodiment. For a specific implementation process, refer to related descriptions of the foregoing method embodiment. Details are not described herein again.

It may be understood that the apparatus in this embodiment may be a terminal.

According to the apparatus for feeding back a HARQ of downlink data in this embodiment of this application, the size of the HARQ feedback codebook is determined based on a receiving state of the information used to indicate SPS activation in the downlink data and the total DAI, and the HARQ feedback codebook includes the HARQ bit for the PDSCH transmission without the corresponding PDCCH or EPDCCH, so as to make a correct receiving response for SPS downlink transmission and extend an applicable scope of a dynamic HARQ codebook.

Figure 11:
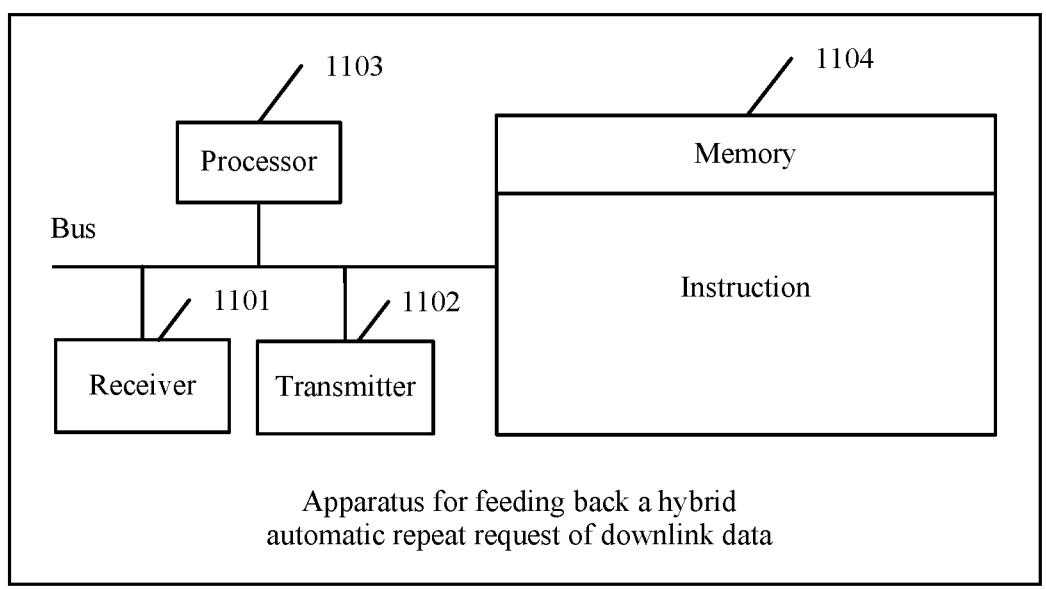
FIG. 11 is a schematic structural diagram of an apparatus for feeding back a HARQ of downlink data according to an embodiment of this application.

FIG. 11 is a schematic structural diagram of an apparatus for feeding back a HARQ of downlink data according to an embodiment of this application. In this implementation, the apparatus may be a terminal or a base station. It may be understood that not all elements of the apparatus are shown in FIG. 11. The apparatus may include a receiver 1101, a transmitter 1102, and a processor 1103. The receiver 1101, the transmitter 1102, and the processor 1103 may communicate with each other by using a bus. The bus may be a peripheral component interconnect (PCI) bus, an extended industry standard architecture (EISA) bus, or the like. The buses may be classified into an address bus, a data bus, a control bus, and the like. For ease of representation, only one bold line is used in FIG. 11 for representation, but it does not indicate that there is only one bus or one type of bus.

The apparatus may further include a memory 1104. The memory 1104 may include a volatile memory, for example, a random-access memory (RAM), or the memory may include a non-volatile memory, for example, a flash memory, a hard disk (HDD), or a solid state disk (SSD). The memory 1104 may further include a combination of the foregoing types of memories.

The processor 1103 may be a central processing unit (CPU), a network processor (NP), or a combination of the CPU and the NP.

The processor 1103 may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof.

Optionally, the memory 1104 is further configured to store a program instruction. The processor 1103 may invoke the program instruction to implement functions of the terminal or the base station in the methods shown in the embodiments in FIG. 2, FIG. 5, and FIG. 6 in this application.

In an implementation, the receiver 1101 is configured to receive downlink data from a base station.

The transmitter 1102 is configured to send a hybrid automatic repeat request HARQ feedback codebook to the base station.

The processor 1103 is configured to generate the HARQ feedback codebook.

A size of the HARQ feedback codebook is determined based on a first total indicator in the downlink data.

The first total indicator is used to denote the total number of serving cells with PDSCH transmission and serving cells with PDCCH or EPDCCH used to indicate downlink SPS release in one subframe, or is used to denote the total number of {serving cell, subframe}-pairs in which PDSCH transmission or the PDCCH or the EPDCCH used to indicate downlink SPS release is present, up to a current subframe in at least one subframe.

The HARQ feedback codebook includes a HARQ bit for a PDSCH transmission without a corresponding PDCCH or EPDCCH.

Optionally, the HARQ bit for the PDSCH transmission without the corresponding PDCCH or EPDCCH is a last bit or a first bit of the HARQ feedback codebook.

In another implementation, the transmitter 1102 is configured to send the downlink data to a terminal.

The receiver 1101 is configured to receive a hybrid automatic repeat request HARQ feedback codebook returned by the terminal.

The downlink data includes a first total indicator, and a size of the HARQ feedback codebook is determined based on the first total indicator.

The first total indicator is used to denote the total number of serving cells with PDSCH transmission and serving cells with PDCCH or EPDCCH used to indicate downlink SPS release in one subframe, or is used to denote the total number of {serving cell, subframe}-pairs in which PDSCH transmission or the PDCCH or the EPDCCH used to indicate downlink SPS release is present, up to a current subframe in at least one subframe.

The HARQ feedback codebook includes a HARQ bit for a PDSCH transmission without a corresponding PDCCH or EPDCCH.

In another implementation, the receiver 1101 is configured to receive downlink data from a base station.

The transmitter 1102 is configured to send a hybrid automatic repeat request HARQ feedback codebook to the base station.

The processor 1103 is configured to generate the HARQ feedback codebook.

A size of the HARQ feedback codebook is determined based on a SPS state and a total downlink assignment indicator in the downlink data.

The HARQ feedback codebook includes a HARQ bit for PDSCH transmission without a corresponding PDCCH or EPDCCH.

Optionally, when the SPS state is an activated state, the size of the HARQ feedback codebook is equal to a size of a first codebook plus 1 bit.

The size of the first codebook is determined based on the total downlink assignment indicator.

Optionally, the processor 1103 configures a first parameter based on a receiving state of information indicating SPS activation or deactivation. The first parameter is used to denote the SPS state or the number of HARQ bits for a PDSCH transmission without a corresponding PDCCH or EPDCCH.

When the information used to indicate SPS activation is received from the base station, a value of the first parameter is 1.

When the information used to indicate SPS deactivation is received from the base station, a value of the first parameter is 0.

Optionally, when the value of the first parameter is greater than 0, the size of the HARQ feedback codebook is equal to a size of a first codebook plus 1 bit.

The size of the first codebook is determined based on the total downlink assignment indicator.

Optionally, the HARQ bit for the PDSCH transmission without the corresponding PDCCH or EPDCCH is a last bit or a first bit of the HARQ feedback codebook.

According to the apparatus for feeding back a HARQ of downlink data in this embodiment of this application, a size of the HARQ feedback codebook is determined based on the downlink data, and the HARQ feedback codebook includes the HARQ bit for the PDSCH transmission without the corresponding PDCCH or EPDCCH, so as to make a correct receiving response for SPS downlink transmission and extend an applicable scope of a dynamic HARQ codebook.

This embodiment of this application further provides a computer storage medium. The computer storage medium may store a program, and when the program is executed, the steps of the methods shown in FIG. 2, FIG. 5, or FIG. 6 are performed.

It should be noted that, for brief description, the foregoing method embodiments are represented as a series of actions. However, this application is not limited to the described order of the actions, because according to this application, some steps may be performed in other orders or simultaneously.

In the foregoing embodiments, the description of each embodiment has respective focuses. For a part that is not described in detail in an embodiment, refer to related descriptions in other embodiments.

A sequence of the steps of the method in the embodiments of this application may be adjusted, combined, or removed according to an actual requirement.

The units in the apparatus in the embodiments of this application may be combined, divided, and deleted according to an actual requirement. A person skilled in the art may integrate or combine different embodiments or characteristics of different embodiments described in the specification.

With descriptions of the foregoing implementations, this application may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by this application includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the principle of this application shall fall within the protection scope of this application.

What is claimed is:

1. A method for hybrid automatic repeat request (HARQ) feedback, comprising:
   receiving, by a terminal, downlink data of a physical downlink shared channel (PDSCH) and downlink data of a physical downlink control channel (PDCCH) from a base station;
   determining, by the terminal, a size of a HARQ feedback codebook based on a state of a semi-persistent scheduling (SPS) PDSCH transmission and a total downlink assignment indicator in the downlink data of the PDCCH, wherein the HARQ feedback codebook comprises a HARQ bit for the SPS PDSCH transmission; and
   sending, by the terminal, the HARQ feedback codebook to the base station;
   wherein the state of the SPS PDSCH transmission is an activated state, the size of the HARQ feedback codebook is equal to a size of a first codebook plus 1 bit, and the size of the first codebook is determined based on the total downlink assignment indicator.

2. The method according to claim 1, wherein the HARQ bit for the SPS PDSCH transmission is a last bit or a first bit of the HARQ feedback codebook.

3. The method according to claim 2, wherein the HARQ bit for the SPS PDSCH transmission is the last bit of the HARQ feedback codebook.

4. The method according to claim 2, wherein the HARQ bit for the SPS PDSCH transmission is the first bit of the HARQ feedback codebook.

5. A method, comprising:
   sending, by a base station, downlink data of a physical downlink shared channel (PDSCH) and downlink data of a physical downlink control channel (PDCCH) to a terminal; and
   receiving, by the base station, a hybrid automatic repeat request (HARQ) feedback codebook from the terminal, wherein a size of the HARQ feedback codebook is based on a state of a semi-persistent scheduling (SPS) PDSCH transmission and a total downlink assignment indicator in the downlink data of the PDCCH, and the HARQ feedback codebook comprises a HARQ bit for the SPS PDSCH transmission;
   wherein the state of the SPS PDSCH transmission is an activated state, the size of the HARQ feedback codebook is equal to a size of a first codebook plus 1 bit, and the size of the first codebook is based on the total downlink assignment indicator.

6. The method according to claim 5, wherein the HARQ bit for the SPS PDSCH transmission is a last bit or a first bit of the HARQ feedback codebook.

7. The method according to claim 6, wherein the HARQ bit for the SPS PDSCH transmission is the last bit of the HARQ feedback codebook.

8. The method according to claim 6, wherein the HARQ bit for the SPS PDSCH transmission is the first bit of the HARQ feedback codebook.

9. A terminal, comprising:
   a receiver, configured to receive downlink data of a physical downlink shared channel (PDSCH) and downlink data of a physical downlink control channel (PDCCH) from a base station;
   a processor, configured to determine a size of a hybrid automatic repeat request (HARQ) feedback codebook based on a state of a semi-persistent scheduling (SPS) PDSCH transmission and a total downlink assignment indicator in the downlink data of the PDCCH; and
   a transmitter, configured to transmit the HARQ feedback codebook to the base station, wherein the HARQ feedback codebook comprises a HARQ bit for the SPS PDSCH transmission;
   wherein the state of the SPS PDSCH transmission is an activated state, the size of the HARQ feedback codebook is equal to a size of a first codebook plus 1 bit, and the size of the first codebook is determined based on the total downlink assignment indicator.

10. The terminal according to claim 9, wherein the HARQ bit for the SPS PDSCH transmission is a last bit or a first bit of the HARQ feedback codebook.

11. The terminal according to claim 10, wherein the HARQ bit for the SPS PDSCH transmission is the last bit of the HARQ feedback codebook.

12. The terminal according to claim 10, wherein the HARQ bit for the SPS PDSCH transmission is the first bit of the HARQ feedback codebook.

13. A base station, comprising:
   a transmitter, configured to transmit downlink data of a physical downlink shared channel (PDSCH) and downlink data of a physical downlink control channel (PDCCH) to a terminal; and
   a receiver, configured to receive a hybrid automatic repeat request (HARQ) feedback codebook from the terminal, wherein a size of the HARQ feedback codebook is based on a state of a semi-persistent scheduling (SPS) PDSCH transmission and a total downlink assignment indicator in the downlink data of the PDCCH, and the HARQ feedback codebook comprises a HARQ bit for the SPS PDSCH transmission;
   wherein the state of the SPS PDSCH transmission is an activated state, the size of the HARQ feedback codebook is equal to a size of a first codebook plus 1 bit, and the size of the first codebook is based on the total downlink assignment indicator.

14. The base station according to claim 13, wherein the HARQ bit for the SPS PDSCH transmission is a last bit or a first bit of the HARQ feedback codebook.

15. The base station according to claim 14, wherein the HARQ bit for the SPS PDSCH transmission is the last bit of the HARQ feedback codebook.

16. The base station according to claim 14, wherein the HARQ bit for the SPS PDSCH transmission is the first bit of the HARQ feedback codebook.

* * * * *